United States Patent
Karlsson et al.

(10) Patent No.: US 7,065,055 B1
(45) Date of Patent: Jun. 20, 2006

(54) ZERO DELAY INTERFERENCE CANCELLATION

(75) Inventors: Jonas Karlsson, Yokohama (JP); Riaz Esmailzadeh, Yokohama (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 581 days.

(21) Appl. No.: 09/665,200

(22) Filed: Sep. 18, 2000

Related U.S. Application Data (60) Provisional application No. 60/207,703, filed on May 26, 2000.

(51) Int. Cl.
H04B 1/44 (2006.01)

(52) U.S. Cl. .................. 370/282; 370/342; 370/500; 375/346

(58) Field of Classification Search .............. 370/335, 370/342, 337, 347, 282, 317, 320, 500; 375/349, 375/357; 455/463.1
See application file for complete search history.

(56) References Cited

U.S. PATENT DOCUMENTS

| | | | |
|---|---|---|---|
| 4,694,467 A | 9/1987 | Mui | |
| 5,467,368 A * | 11/1995 | Takeuchi et al. | 375/148 |
| 5,506,861 A | 4/1996 | Bottomley | 375/200 |
| 5,579,304 A * | 11/1996 | Sugimoto et al. | 370/342 |
| 5,687,162 A | 11/1997 | Yoshida et al. | 370/203 |
| 5,920,553 A * | 7/1999 | Keskitalo et al. | 370/335 |
| 5,926,471 A | 7/1999 | Shoji | 370/342 |
| 5,930,289 A | 7/1999 | Laakso et al. | 375/200 |
| 5,966,374 A * | 10/1999 | Rasanen | 370/337 |
| 6,034,986 A * | 3/2000 | Yellin | 375/148 |
| 6,081,516 A * | 6/2000 | Yoshida et al. | 370/342 |
| 6,590,888 B1 * | 7/2003 | Ohshima | 370/342 |
| 6,628,701 B1 * | 9/2003 | Yellin | 375/148 |

FOREIGN PATENT DOCUMENTS

| | | |
|---|---|---|
| JP | 60-279901 | 6/1987 |
| JP | 11-043221 | 9/2000 |
| WO | WO 98/43362 | 10/1998 |

OTHER PUBLICATIONS

ISR, PCT/SE 01/0174, Dated: Dec. 7, 2001.

* cited by examiner

Primary Examiner—Chau Nguyen
Assistant Examiner—Ian N. Moore
(74) Attorney, Agent, or Firm—Roger Burleigh (57) ABSTRACT

Method and apparatus for minimizing the processing delay incurred by an IC receiver over conventional receivers in a CDMA cellular system are disclosed. The method and apparatus involve operating the conventional receiver and the IC receiver in parallel to each other. Data from the conventional receiver are then used to supplement data from the IC receiver in order to minimize the delays incurred by the IC receiver.

14 Claims, 6 Drawing Sheets

ZERO DELAY INTERFERENCE CANCELLATION

CROSS-REFERENCES TO RELATED APPLICATIONS

This Application for patent claims the benefit of priority from, and hereby incorporates by reference the entire disclosure of, co-pending U.S. Provisional Application for Patent Ser. No. 60/207,703, filed May 26, 2000.

BACKGROUND OF THE PRESENT INVENTION

1. Field of the Invention

The present invention relates to the use of Code Division Multiple Access (CDMA) techniques in mobile cellular communication systems and, more particularly, to a method and apparatus for minimizing the delay due to processing of interference cancellation algorithms.

2. Background of the Invention

Most presently available CDMA cellular communication systems use some type of spread spectrum modulation wherein the encoded information signal is spread over a very wide frequency range during transmission. A unique spreading sequence assigned to each user allows multiple users to transmit simultaneously over the same frequency range. The spread spectrum modulated signals may then be despread using the unique spreading sequences to recover the information signals. The information signals are thereafter decoded back into their original form.

Figure 1:
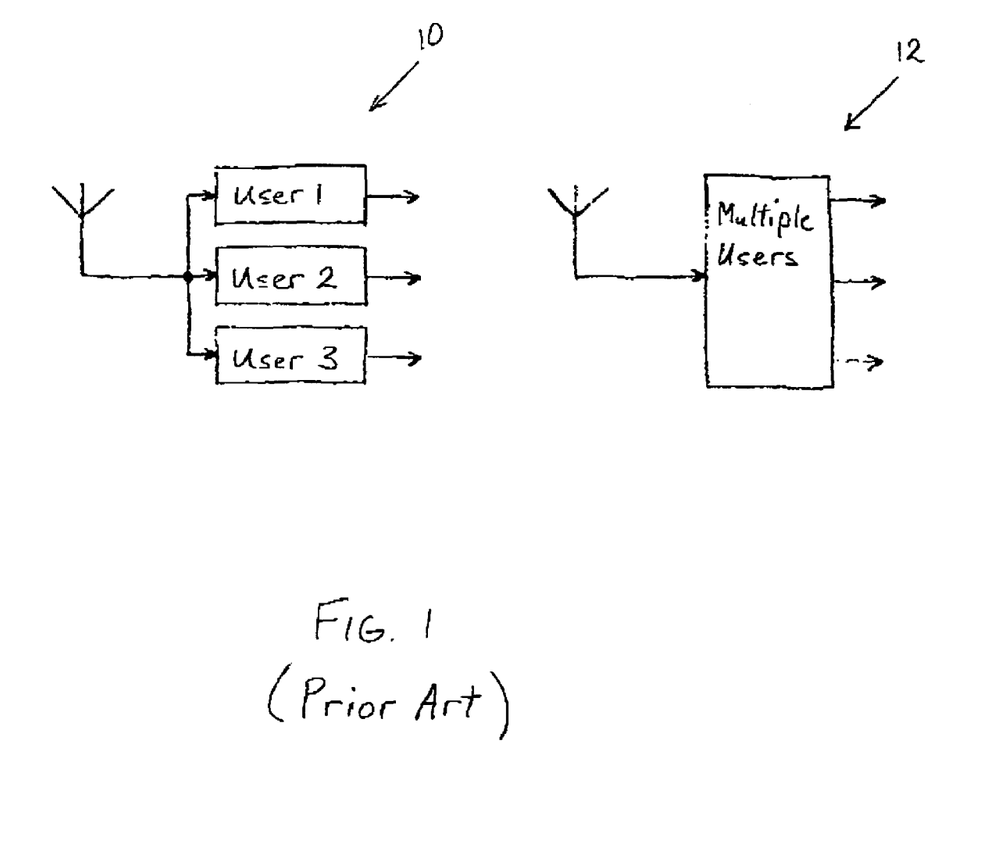
FIG. 1 illustrates single and multiple user detectors.

Referring to FIG. 1, a detector such as a single-user detector 10 or a multiple-user detector 12, can be used to detect the spread spectrum modulated signal and recover the information signal. In general, the single-user detector 10 detects spread spectrum modulated signals on an individual user basis without relying on information about other users. The multiple-user detector 12, on the other hand, detects spread spectrum modulated signals for several users jointly, i.e., information about one user (e.g., bit decisions, spreading sequences, channel estimates, path profiles, etc.) may also be used for other users.

Figure 2:
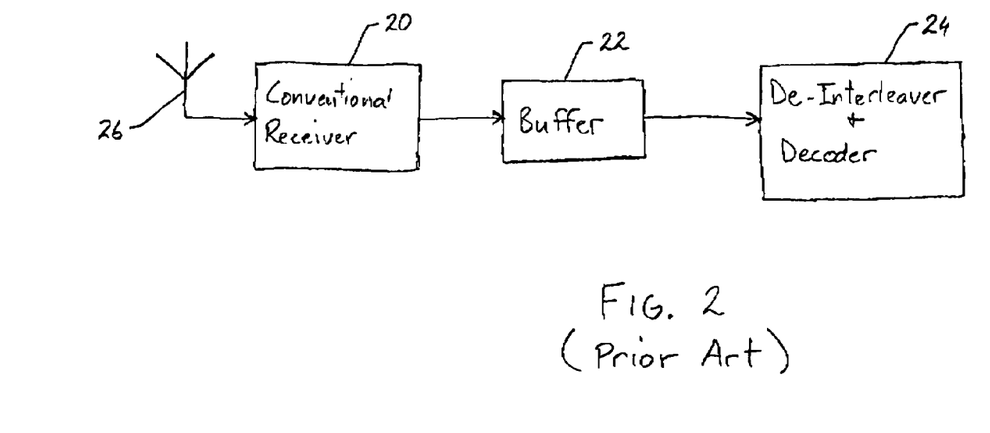
FIG. 2 illustrates a detector having a conventional receiver.

Referring to FIG. 2, both the single-user and multiple-user types of detectors generally include a conventional receiver 20, a buffer 22, and a de-interleaver/decoder 24. The conventional receiver 20 receives the spread spectrum modulated signal from an antenna assembly 26 and despreads the signal using standard techniques that are well known to those of ordinary skill in the art. The recovered information signal is then passed to the buffer 22 for temporary storage, and subsequently forwarded to the de-interleaver/decoder 24 for de-interleaving and decoding.

The above method, however, does not take into account information about interfering signals that may be present. For example, if too many users are transmitting simultaneously over the same frequency range, a phenomenon called multiple access interference may begin to degrade system performance. To improve the system performance, special receivers called interference cancellation (IC) receivers may be employed. These IC receivers use special interference cancellation algorithms that make use of information about the spread spectrum modulated signal and the interfering signals to optimize the despreading process and enhance recovery of the information signal.

Included among the information used by the interference cancellation algorithms are the spreading sequence mentioned previously and a spreading factor of the spread spectrum modulated signal. The spreading factor, also called the processing gain, is essentially the ratio of the bandwidth of the spread spectrum modulated signal over the bandwidth of the information signal. In general, a higher spreading factor is desirable because the higher the spreading factor, the less susceptible a system will be to interference.

Unfortunately, the complex interference cancellation algorithms introduce a larger delay into the despreading process compared to the conventional receivers. Thus, for some commercial services such as voice services that require short processing delays, use of an advanced interference cancellation algorithm may not be feasible. Moreover, the recently developed third generation standard for CDMA cellular systems requires information about the spreading factor to be distributed over a whole data frame in the information signal. However, the delay of waiting for an entire data frame in order to extract the spreading factor combined with the larger processing delay of the IC receiver may not be acceptable to those services that require short processing delays.

Therefore, it is desirable to be able to minimize any delays incurred in the processing of spread spectrum modulated signals in CDMA cellular systems. More specifically, it is desirable to be able to reduce the processing delay incurred by the interference cancellation algorithms of IC receivers over conventional receivers in such CDMA cellular systems.

SUMMARY OF THE INVENTION

The present invention is related to a method and apparatus for minimizing the processing delay incurred by an IC receiver over conventional receivers in a CDMA cellular system. In accordance with the invention, the conventional receiver and the IC receiver are operated in parallel to each other. Data from the conventional receiver are then used to supplement data from the IC receiver in order to minimize the delays incurred by the IC receiver.

In one aspect, the invention is related to a method of reducing signal processing delay time in a CDMA cellular communications system. The method comprises processing a data frame according to a first process, simultaneously processing the data frame according to a second process, and combining selected segments of the data frame processed according to the first process with selected segments of the data frame simultaneously processed according to the second process.

In another aspect, the invention is related to a signal receiving apparatus for reducing signal processing delay time in a CDMA cellular communications system. The apparatus comprises a first processor for processing a data frame, a second processor for simultaneously processing the data frame, and a selector coupled to the first and second processors, wherein the selector is adapted to combine selected segments of the data frame processed by the first processor with selected segments of the data frame simultaneously processed by the second processor.

A more complete appreciation of the present invention and the scope thereof can be obtained from the accompanying drawings (which are briefly summarized below), the following detailed description of the presently-preferred embodiments of the invention, and the appended claims.

BRIEF DESCRIPTION OF THE DRAWINGS

A more complete understanding of the method and apparatus of the present invention may be obtained by reference to the following detailed description when taken in conjunction with the accompanying drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

As mentioned previously, the present invention provides a way to reduce the processing delay incurred by the IC receiver or, more specifically, by the interference cancellation algorithm of the IC receiver. In accordance with the invention, data from a conventional receiver operating in parallel with the IC receiver may be used to supplement data from the IC receiver. Under this arrangement, delays incurred by the IC receiver in excess of the typical processing time of the conventional receiver may be reduced or entirely eliminated.

Figure 3:
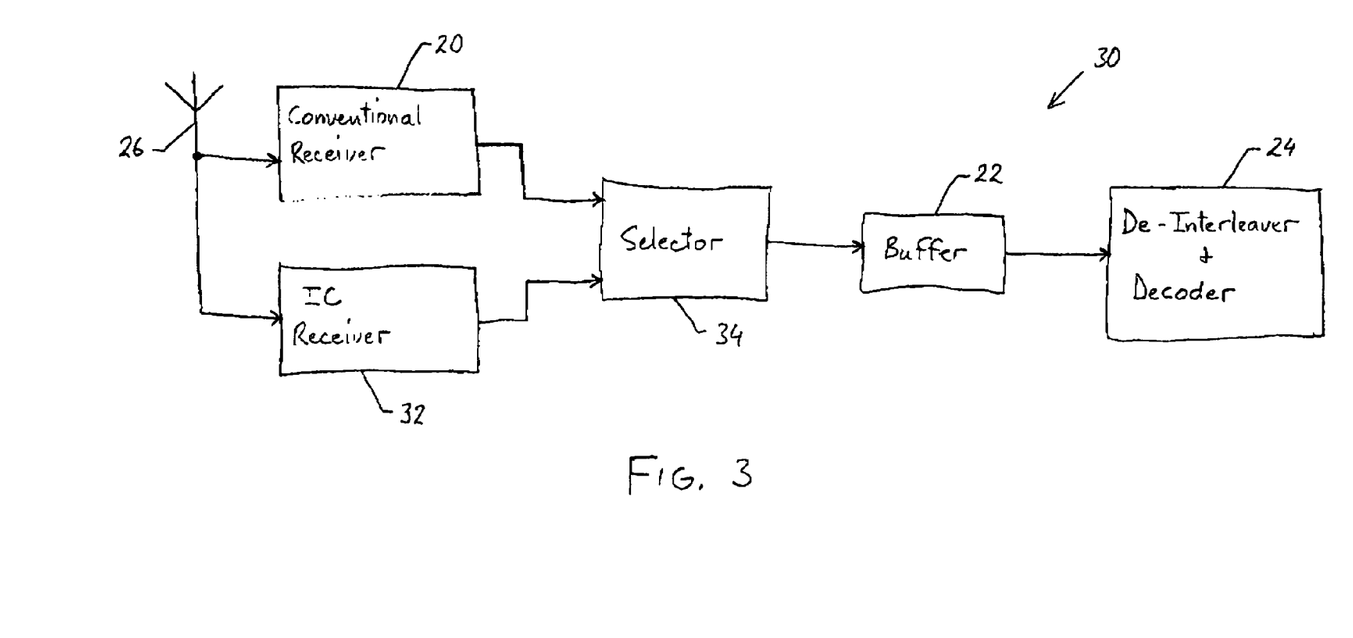
FIG. 3 illustrates a detector according to one embodiment of the present invention.

Referring now to FIG. 3, in an exemplary embodiment of the present invention, a detector 30 includes the conventional receiver 20 described above (see FIG. 2) and an IC receiver 32. The IC receiver 32 employs a special interference cancellation algorithm that uses information about the interfering signals and the spread spectrum modulated signal, including the spreading factor thereof, to enhance recovery of the information signal. Reception of the spread spectrum modulated signal is effected by the antenna assembly 26 which provides the signal to both the conventional receiver 20 and the IC receiver 32. The conventional receiver 20 and the IC receiver 32 then process the spread spectrum modulated signal in parallel, and output the recovered information signal to a selector 34.

The selector 34 functions to select between the outputs of the conventional receiver 20 and the IC receiver 32 and provides the selected output to a buffer 22. In a preferred exemplary embodiment, the selector 34 combines selected portions of the two outputs and provides the combined output to the buffer 22, as will be described further below. The information signal from the selector 34 is then temporarily stored in the buffer 22 for subsequent de-interleaving and decoding by the de-interleaver/decoder 24. Details of the de-interleaving and decoding processes are well known to those of ordinary skill in the art and will not be described here. Suffice it to say, however, that the de-interleaver/decoder 24 and the processes performed thereby have been highly optimized such that de-interleaving and decoding of the information signal may be done very quickly and efficiently. Accordingly, one of the functions of the buffer 22 is to provide a steady queue of information signals that are ready to be processed by the de-interleaver/decoder 24. Therefore, it is expedient that the selector 34 outputs the information signals to the buffer 22 with as little unnecessary delay as possible.

Figure 4:
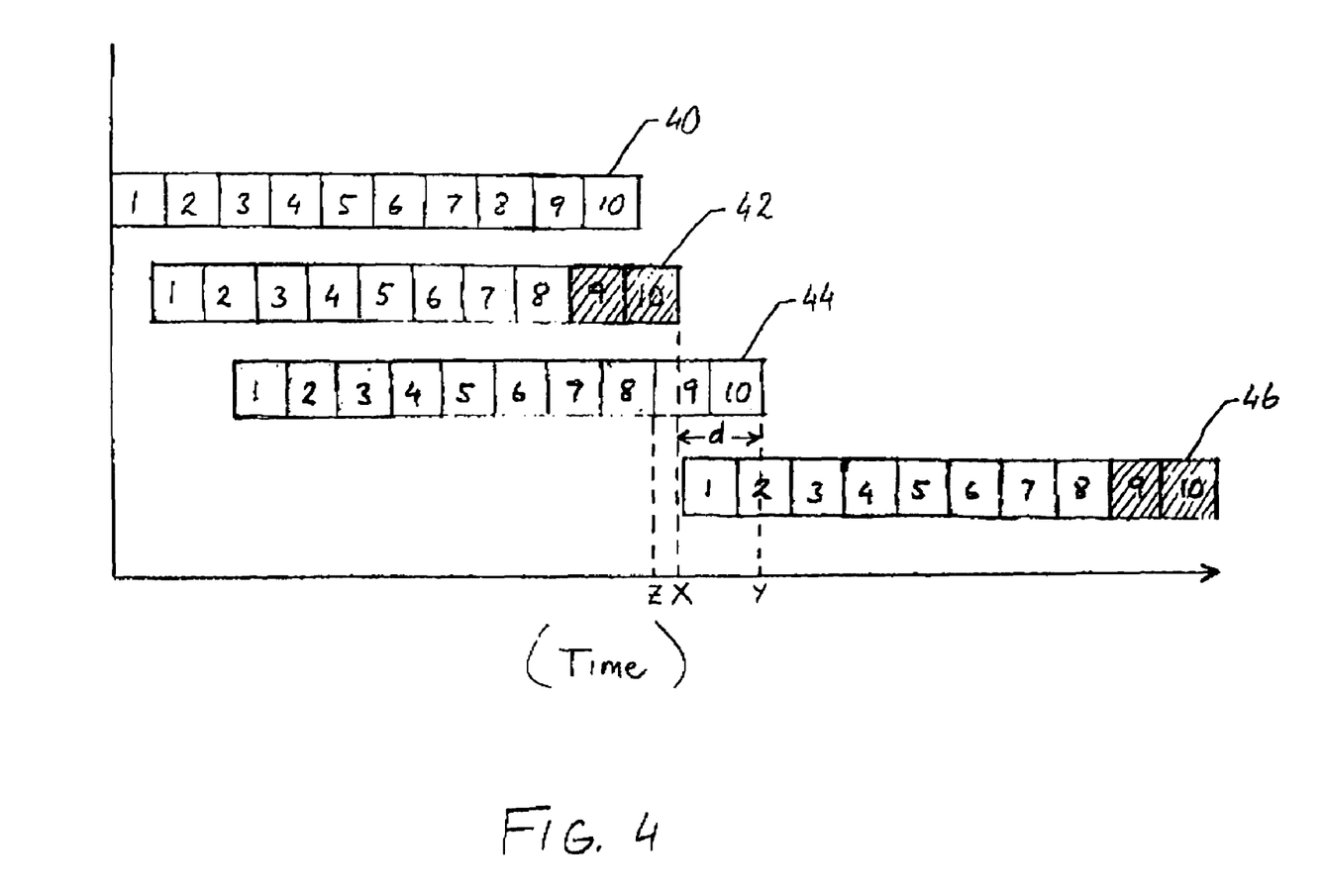
FIG. 4 illustrates the timing diagram according to the embodiment of FIG. 3.

A better understanding of the operation of the selector 34 may be had with reference to FIG. 4, wherein a timing diagram illustrates the relative timing of a data frame received and processed by the detector 30. As is well known to those of ordinary skill in the art, information transmitted over a cellular link may be divided into frames, each frame having a plurality of segments. The frames are received and processed segment by segment on a first in first out basis. In FIG. 4, the top data frame represents a received frame 40 having a plurality of segments numbered from 1–10. The second frame represents the received frame 40 after it has been processed by the conventional receiver 20, and will be referred to herein as the conventional frame 42. The third frame also represents the received frame 40, but after it has been parallel processed by the IC receiver 32, and will be referred to herein as the IC frame 44. Note that the conventional and IC frames 42 and 44 are shifted in time relative to the received frame 40 due to processing delays, with the IC frame 44 suffering a somewhat larger delay. Finally, the last data frame represents the received frame 40 after it has been provided to the buffer 22, and will be referred to herein as the buffer frame 46.

As can be seen, the faster conventional receiver 20 can typically complete processing of the conventional frame 42 at approximately time 'x', whereas the IC receiver 32 does not typically complete processing of the IC frame 44 until approximately time 'y'. Thus, the IC receiver 32 incurs an incremental delay of time 'd', which is the difference between time 'x' and time 'y', relative to the conventional receiver 20. This incremental delay time 'd' is due, in large part, to the additional processing required by the complex interference cancellation algorithm of the IC receiver 32. Although some cellular communications systems may be able to efficiently manage the incremental delay, certain commercial systems with strict timing requirements may not be able to handle the extra delay in an efficient manner, if at all. In particular, for systems using multiple-user type detectors wherein user information is shared among several users, an incremental delay in signal processing for any user may delay or otherwise adversely affect the signal processing for one or several other users.

In order to avoid such incremental delays, the selector 34 may combine selected segments from both the conventional frame 42 and the IC frame 44. For example, the selector 34 may accept only the first eight segments 1–8 (shaded area) of the IC frame 44 and then obtain the last two segments 9–10 (cross-hatch area) from the conventional frame 42. Because processing of the first eight segments 1–8 of the IC frame 44 will be completed at approximately time 'z', prior to time 'x', no incremental delay will be incurred as a result of the IC receiver 32. In other words, by using a combination of segments, the selector 34 may construct the buffer frame 46 in substantially the same amount time as if only the conventional frame 42 was used. Thus, the present invention is able to provide the enhanced performance associated with the IC receivers while incurring essentially zero delay time relative to conventional receivers.

Although only the first eight segments 1–8 of the IC frame 44 were used in the above example, it should be clear to those of ordinary skill in the art that a different number of segments may be used depending on the complexity of the interference cancellation algorithm and, hence, the delay incurred thereby. Indeed, in the preferred embodiment, the number of segments selected from the IC frame 44 is not a predefined number; rather the selector 34 may dynamically adjust the number of segments selected as needed to reduce or eliminate the incremental delay time.

In addition to the above incremental delay, a delay may also be incurred due to the requirement that the spreading factor be sent over an entire data frame in the third generation standard for CDMA cellular systems. Recall that the spreading factor, along with other types of information, is used by the interference cancellation algorithm of the IC receiver to despread the spread spectrum modulated signal. Under the third generation standard, the IC receiver would have to wait for an entire data frame to be received to obtain the correct spreading factor and begin despreading that frame. Note that the conventional receiver will also have to wait for the spreading factor, but can thereafter complete the despreading process much faster than the IC receiver.

Figure 5:
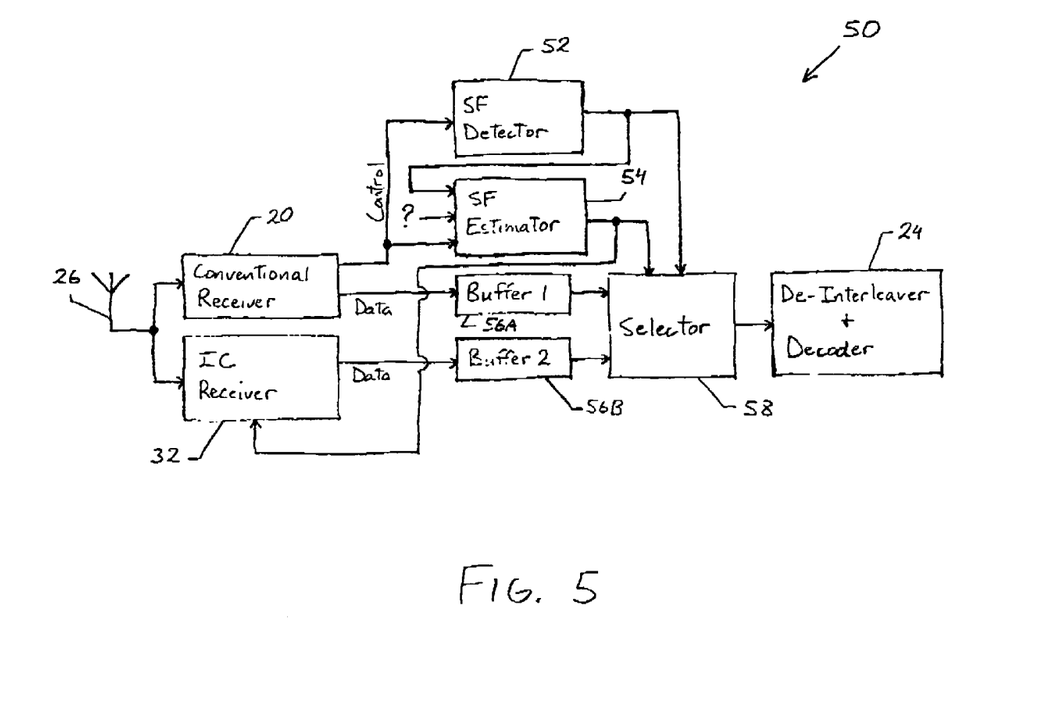
FIG. 5 illustrates a detector according to another embodiment of the present invention.

In order to avoid a delay of an entire data frame, the IC receiver may begin the despreading process based on an estimate of the spreading factor instead of waiting for the correct spreading factor, as will now be described. Referring to FIG. 5, in another exemplary embodiment of the invention, a detector 50 includes the previously discussed conventional receiver 20, de-interleaver/decoder 24, antenna assembly 26, and IC receiver 32. In addition, the detector 50 also includes a spreading factor detector 52, a spreading factor estimator 54, a first buffer 56*a*, a second buffer 56*b*, and a selector 58, connected as shown. Operation of the detection 50 is as follows.

The antenna assembly 26 provides a spread spectrum modulated signal to the conventional receiver 20 and IC receiver 32. The spread spectrum modulated signal is then despread by the conventional receiver 20 and the IC receiver 32 in parallel to recover the information signal. As is well known to those of ordinary skill in the art, transmission of an information signal over a cellular link involves the use of a number of channels including a data channel and one or more control channels. The data channel carries the actual data that are to be transmitted, whereas the control channels contain administrative information such as the received signal strength, synchronization codes, and the correct spreading factor. These channels are included in the spread spectrum modulated signal and are subsequently recovered during the despreading process. Data from the data channel are then provided to the first buffer 56*a*, while information contained in the control channels is passed to the spreading factor detector 52, as shown.

The spreading factor detector 52 functions to extract the correct spreading factor for a frame based on the information contained in the control channels after the entire frame has been received. However, this procedure injects a delay into the despreading process at the IC receiver. Therefore, in accordance with the present invention, instead of waiting for the entire data frame to be received and the correct spreading factor extracted, the IC receiver 32 may begin the despreading process beforehand using an estimate of the spreading factor as provided by the spreading factor estimator 54. The spreading factor estimator 54 estimates the spreading factor using information such as previous spreading factors from earlier data frames, various types of administrative information in the control channel, the power ratio between the control channels and the data channel, detection of the TFCI (transport format combination indicator) bits, and other types of information as represented by the "?" character. A simple initial estimate of the spreading factor for any given data frame may be, for example, the spreading factor of the immediately preceding frame. Then, updated estimates of the spreading factor may be provided throughout the despreading process as more of the data frame is received. When an estimate of the spreading factor is obtained which is different from that currently being used, the IC receiver 32 will start using the updated spreading factor instead. The IC receiver 32 then outputs the despread data to the second buffer 56*b* for temporary storage.

Once a complete frame has been received, the selector 58 compares the correct spreading factor as extracted by the spreading factor detector 52 with the estimated spreading factors provided by the spreading factor estimator 54. Preferably the estimated spreading factors and the correct spreading factor will be substantially the same. However, if one or more of the estimated spreading factors are substantially different from the correct spreading factor, then there is a risk that a large portion or even the entire data frame recovered by the IC receiver 32 may be invalid. In that case, the selector 58 may choose to discard all or a portion of the data frame recovered by the IC receiver 32 as stored in the second buffer 56*b* and use all or a portion of the data frame recovered by the faster conventional receiver 20 instead, as stored in the first buffer 56*a*.

Figure 6:
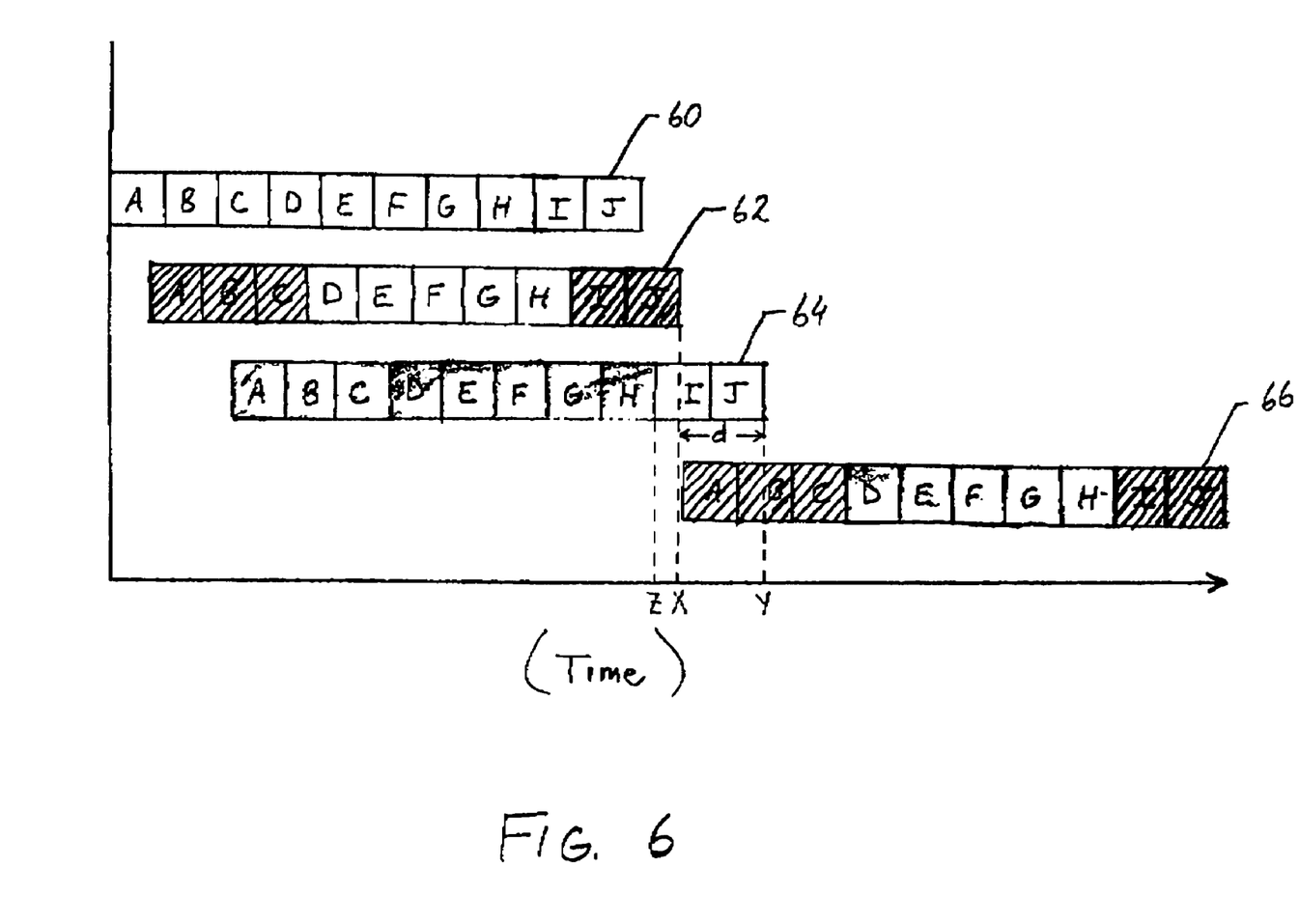
FIG. 6 illustrates the timing diagram according to the embodiment of FIG. 5.

Referring now to FIG. 6, a timing diagram illustrating the relative timing of a data frame received and processed by the detector 50 is shown. The top data frame represents a received frame 60 having a plurality of segments labeled from A–J. The second frame represents the received frame 60 after it has been processed by the conventional receiver 20, and will be referred to herein as the conventional frame 62. The third frame also represents the received frame 60, but after it has been parallel processed by the IC receiver 32, and will be referred to herein as the IC frame 64. Finally, the last data frame represents the received frame 60 as it is provided to the de-interleaver/decoder 24 by the selector 58, and will be referred to herein as the selected frame 66.

In order to avoid passing an invalid frame or invalid segments of a frame to the de-interleaver/decoder 24, the selector 58 may combine certain selected segments from both the conventional frame 62 and the IC frame 64. For example, in order to reduce or eliminate any incremental delays, the selector 58 may accept only the first eight segments A–H (shaded area) of the IC frame 64 and obtain the remaining two segments I–J (cross-hatch area) from the conventional frame 62. In this regard, this portion of the example is similar to the example discussed in connection with FIG. 4. However, if the selector 58 determines that the estimated spreading factor used by the IC receiver 32 to despread, say, the first three segments A–C is substantially different from the correct spreading factor, the selector 58 may discard these three segments and replace them with the first three segments A–C (cross-hatch area) from the conventional frame 62. Accordingly, the selected frame 66 that will be provided to the de-interleaver/decoder 24 will include a number of conventionally despread segments A–C and I–J as well as a number of segments D–H that have been despread using an interference cancellation algorithm.

Figure 7:
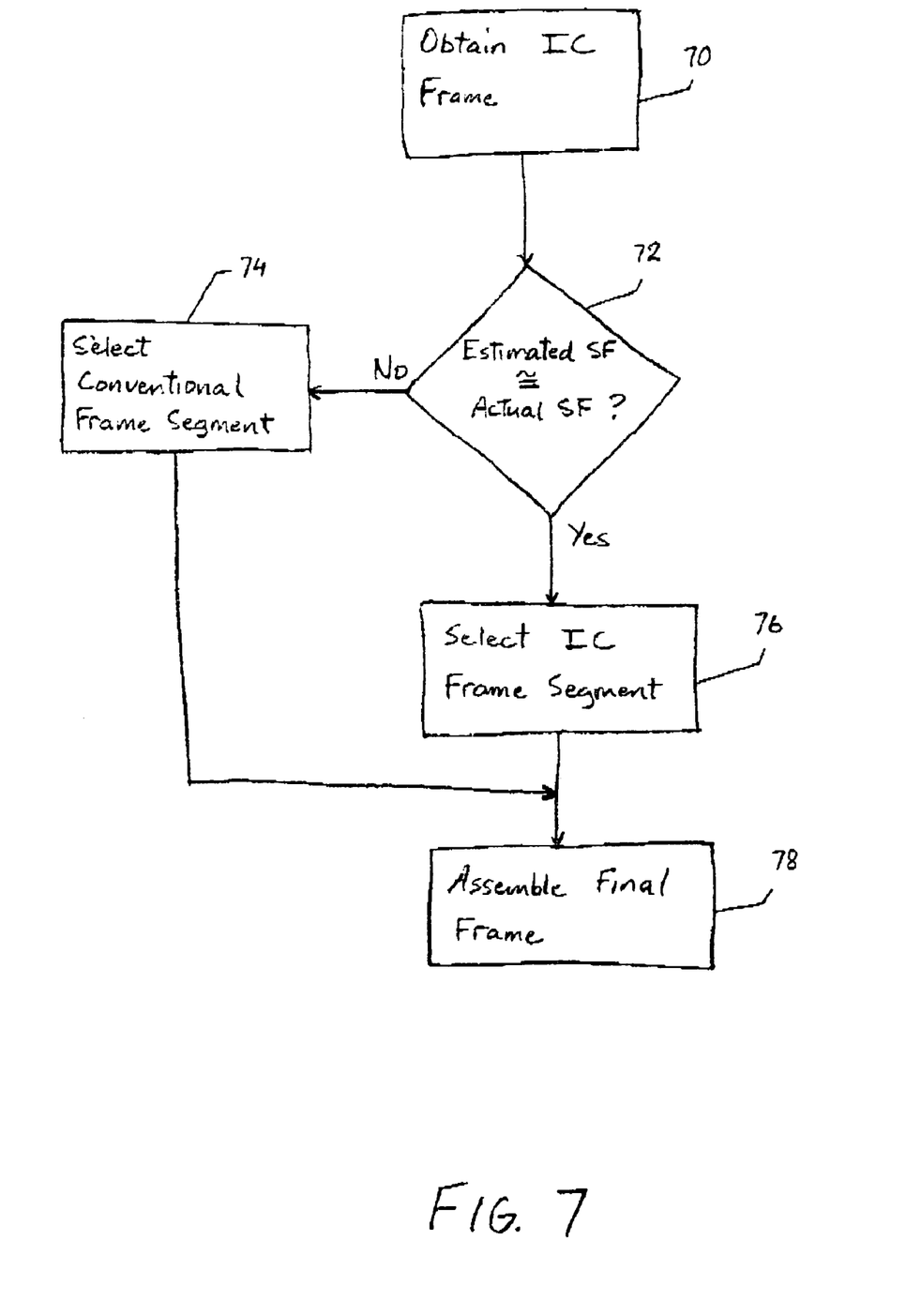
FIG. 7 illustrates a flowchart of a selection process according to the embodiment of FIG. 5.

FIG. 7 illustrates the decision-making process of the selector 58. At step 70, an IC frame is obtained. For each segment in the frame, a comparison is made between the estimated spreading factor used and the actual or correct spreading factor at step 72. If there is a substantial difference between the two spreading factors, the IC frame segment is discarded and the conventional frame segment is selected at step 74. If the two spreading factors are substantially similar, the IC frame segment is selected at step 76. Once all the frame segments have been selected, the final frame is assembled at step 78. In this way, the present invention is able to provide the enhanced performance associated with the IC receiver while reducing the risk of propagating an invalid segment and also incurring essentially zero delay time relative to conventional receivers.

Although the invention has been described with reference to specific embodiments, various modifications and alternatives exist which were not described, but which are within the scope and spirit of the invention. Accordingly, the invention should be limited only by the following claims.

What is claimed is:

1. A method of reducing signal processing delay time in a CDMA cellular communications system, the method comprising:

processing a data frame according to a first process;

simultaneously processing said data frame according to a second process in parallel to said first process, wherein said second process uses an interference cancellation algorithm; and combining selected segments of said data frame processed according to said first process with selected segments of said data frame simultaneously processed according to said second process, wherein data generated from processing said data frame by said first processor supplements data generated from processing said data frame by said second processor to minimize delays otherwise incurred by said interference cancellation algorithm.

2. The method according to claim 1, further comprising temporarily storing said combined segments of said data frame in a buffer.

3. The method according to claim 1, further comprising de-interleaving and decoding said combined segments of said data frame.

4. The method according to claim 1, wherein said combining step includes selecting only segments that were processed not later in time than a completion of said first process.

5. The method according to claim 1, further comprising estimating a spreading factor to be used with said second process.

6. The method according to claim 5, further comprising detecting a correct spreading factor for said data frame and comparing said estimated spreading factor with said correct spreading factor.

7. The method according to claim 6, wherein said segments that were processed using said estimated spreading factor may be selected only if said estimated spreading factor is substantially the same as said correct spreading factor.

8. A signal receiving apparatus for reducing signal processing delay time in a CDMA cellular communications system, comprising:

a first processor for processing a data frame;

a second processor for simultaneously processing said data frame in parallel to said first processor, wherein said second processor uses an interference cancellation algorithm; and a selector coupled to said first and second processors, said selector adapted to combine selected segments of said data frame processed by said first processor with selected segments of said data frame simultaneously processed by said second processor, wherein data generated from processing said data frame by said first processor supplements data generated from processing said data frame by said second processor to minimize delays otherwise incurred by said interference cancellation algorithm.

9. The apparatus according to claim 8, further comprising a buffer for temporarily storing said combined segments of said data frame.

10. The apparatus according to claim 8, further comprising a de-interleaver and a decoder for de-interleaving and decoding, respectively, said combined segments of said data frame.

11. The apparatus according to claim 8, wherein said selector is adapted to select only segments that were processed not later in time than a completion of said first process.

12. The apparatus according to claim 8, further comprising a spreading factor estimator coupled to said second processor for estimating a spreading factor to be used by said second processor.

13. The apparatus according to claim 12, further comprising a spreading factor detector for detecting a correct spreading factor of said data frame, wherein said selector is further adapted to compare said estimated spreading factor with said correct spreading factor.

14. The apparatus according to claim 13, wherein said segments that were processed using said estimated spreading factor may be selected by said selector only if said estimated spreading factor is substantially the same as said correct spreading factor.

* * * * *